United States Patent [19]

Hållstedt

[11] 4,174,136
[45] Nov. 13, 1979

[54] SHOCK ABSORBING DEVICE FOR SLIDING BEARINGS

[75] Inventor: Göran Hållstedt, Floda, Sweden

[73] Assignee: Aktiebolaget SKF, Göteborg, Sweden

[21] Appl. No.: 860,335

[22] Filed: Dec. 14, 1977

[30] Foreign Application Priority Data

Jan. 18, 1977 [SE] Sweden ............... 7700451

[51] Int. Cl.² .................................. F16C 17/00
[52] U.S. Cl. ........................... 308/5 R; 308/9; 308/26; 308/73; 308/160
[58] Field of Search ............... 308/5 R, 9, 26, 73, 308/142, 160, DIG. 1

[56] References Cited

U.S. PATENT DOCUMENTS

| | | | |
|---|---|---|---|
| 2,218,783 | 10/1940 | Bernhard | 308/142 |
| 3,675,977 | 7/1972 | Arsenius et al. | 308/9 |
| 3,994,367 | 11/1976 | Christ | 308/9 |

*Primary Examiner*—Charles E. Frankfort

*Attorney, Agent, or Firm*—Eugene E. Renz, Jr.

[57] ABSTRACT

A shock absorbing device for sliding bearings, such as hydrostatic bearings or hydrodynamic bearings particularly adapted for absorbing shock loads from a crusher shaft of a bell crusher comprising a base and a first element mounted on the base, a first chamber between the first element and the base of predetermined cross sectional area. The chamber is adapted to be supplied with a fluid under pressure. A second element is mounted between the machine member such as the crusher shaft and the first element and spaced from the latter to define a second chamber in fluid communication with the first chamber. The ball is mounted in a spherical seat in the first element and a piston in the second element engages the ball on the side thereof opposite the seat. Biasing means normally urges the piston against the ball. By this arrangement, load from the crusher shaft which exceeds the biasing force against the ball affects flow of pressure fluid from the second chamber to the first chamber and out through the flow slots between the first element and base.

2 Claims, 1 Drawing Figure

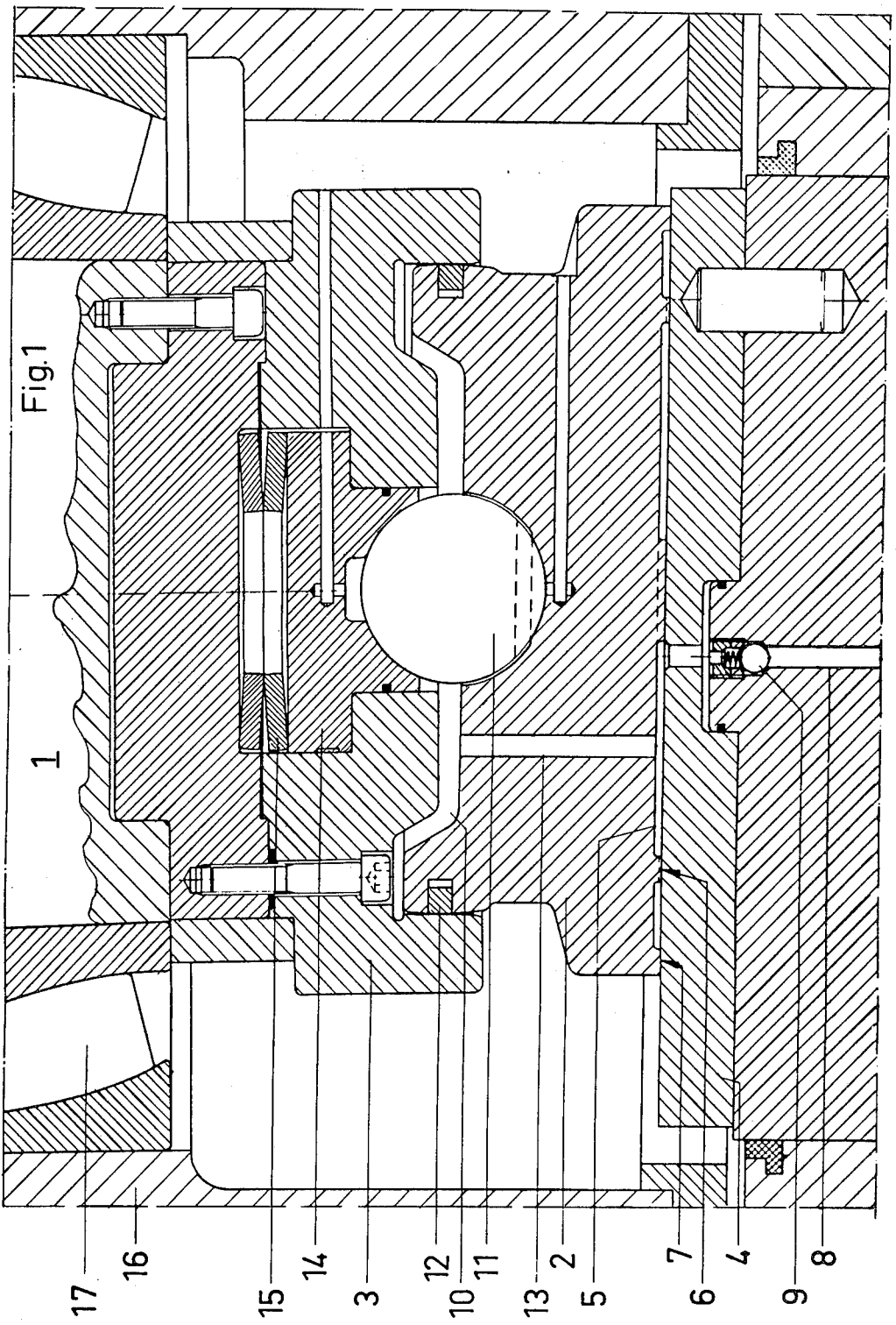

SHOCK ABSORBING DEVICE FOR SLIDING BEARINGS

BACKGROUND OF THE INVENTION

The present invention refers to a shock absorbing device for sliding bearings, e.g. hydrostatic or hydrodynamic bearings.

It is essential if a bearing shall operate without disturbances that the lubricant film between the movable parts is not broken and that metallic contact will not result. It is generally easy to control that oil is at hand between the bearing parts in a bearing working under calculated and stationary conditions. Within certain fields of use it is however possible that load shocks will arise. These shocks can be of very short duration but they can also occur over a longer period of time. When these shocks occur, it is likely that there will be a deterioration of the oil film, whereby a metallic contact will result. Such metallic contact often leads to bearing damages.

In certain bearings, e.g. hydrodynamic sliding bearings, it is possible to absorb such shocks by means of a highly viscous oil. The bearings can also be supported by a stack of spring which makes it resilient. Such methods are however often not sufficient. It can be particularly difficult to obtain the desired effect by means of a highly viscous oil if the speeds of relative motion are low. This can be the case e.g. at bell crushers where only a relatively slow reciprocal motion of the bearings supporting the bell will be at hand.

SUMMARY OF THE PRESENT INVENTION

The problem of the shock loads has been solved according to the present invention and a shock absorbing device for hydrostatic and hydrodynamic bearings is provided, which includes a lower or first part which confronts a base and which rests upon an oil film in a first chamber between the lower part and base and an upper part which encloses or is enclosed by the lower part and which is sealed off from this, a space or second chamber being arranged between said lower and upper parts, said space being in fluid communication with the first chamber and intended to contain pressure oil and a ball partly supporting the load. The shock absorbing device is characterized mainly thereby that a vertically movable piston disposed in the upper part, rests against the upper side of the ball, said piston being pressed against the ball by means of biased spring action, channel(s) being arranged in the lower part to allow oil to be forced out of the space between the upper and the lower parts and out through the slot between the lower part and the base at the occurrence of heavy loads, which exceed the biasing force against the ball.

In order to allow the bearing to operate in a desired manner it is important that the horizontal cross-sectional area of the second chamber for the oil disposed between the lower and the upper parts be less than the cross-sectional area of the first chamber between the lower part and the base.

In order to being about the biasing of the absorbing device it is preferable to use cup springs or washer springs, but it is also possible to use oil under pressure or the like.

The invention will herebelow be described together with a bell crusher, but it is of course possible to use it also for other types of machinery. It should be pointed out that the shock absorbing device will operate correspondingly well if the bearing is turned upside down. The lower part mentioned in the claims will then be regarded as the upper part, etc.

DESCRIPTION OF THE DRAWING

The invention will hereinafter be further described with reference to the accompanying drawing, in which FIG. 1 shows a section of a shock absorbing device at a hydrostatic bearing for a bell crusher.

DESCRIPTION OF A PREFERRED EMBODIMENT

In FIG. 1 is shown the very crusher shaft 1 of a bell crusher which is supported by a hydrostatic bearing comprising a lower part 2 and an upper part 3. The lower part 2 rests on the base 4 and is separated therefrom by means of an oil layer 5 in a first chamber of a predetermined cross-sectional area. The oil layer has been produced by high pressure oil. Oil from the layer 5 flows out through throttles 6 and 7. A pressure conduit 8 has been arranged in the base 4 for supply of oil and a non-return valve 9 is inserted in this conduit.

Between the lower part 2 and the upper part 3 is a space 10 defining a second chamber for pressure oil and a ball 11. In order to seal off the space 10 a seal 12 extending around the space has been arranged. The space 10 communicates with the oil layer 5 via a duct 13. It is also necessary that the horizontal cross-sectional area of the second chamber or space 10 be smaller than the cross-sectional area of the first chamber providing effective supporting surface generated by the film 5. The upper part 3 should in other case be lifted from the lower part 2.

Upon the ball 11 rests a piston 14, which by means of spring 15 is pressed down against the ball 11. The spring 15 shall give the piston 14 a biasing effect, which exceed the portion of the load supported by the ball 11 at normal load conditions. The ball 11 and the piston 14 are thereby retained in their lower positions in relation to the upper part 3.

If a load shock which is directed downwards will come from the bell then the springs 15 will be compressed and the piston 14 will move upwards in the upper part 3 (or if that is preferred the upper part 3 will move downwards about the piston 14). The volume of the space 10 will thereby be reduced and oil will be forced out via the channel 13 and the throttles 6 and 7. It is hereby prevented that metallic contact can result at the throttles 6 and 7.

The bell crusher is thereabove of conventional design with a rotating portion 16, which due to excentricity and via the bearing 17 will bring about a small rotating movement in the bearing surface 5.

The invention is not limited to the embodiments shown but can be modified in different ways within the scope of the appended claims.

I claim:

1. A device mounted between a machine member and a base adapted to absorb shock loads which the machine member is subjected to comprising a first element confronting the base, means defining a first chamber between the first element and base of a predetermined cross sectional area, means defining throttling slots between said first element and base, means for supplying a fluid under pressure to said first chamber, a second element mounted between the machine member and said first element and spaced from the latter to define a second chamber in fluid communication with said first chamber, the cross sectional area of said second chamber being less than said predetermined cross sectional area of said first chamber, a ball mounted in a spherical seat in said first element, a piston in said second element engaging said ball on the side thereof opposite the seat, biasing means normally urging said piston against said ball and operable to support a predetermined load, shock loads from said machine element in excess of said predetermined load causing flow of pressure fluid from said second chamber to said first chamber and out through said throttling slots to thereby prevent contact between said first element and base.

2. A device as claimed in claim 1 wherein said biasing means comprises cup springs.

* * * * *